April 12, 1960     E. B. COALE ET AL     2,932,710
CONSTRUCTION IN ELECTRICALLY CONDUCTING TRANSPARENT PANEL
Filed March 7, 1955     4 Sheets-Sheet 1
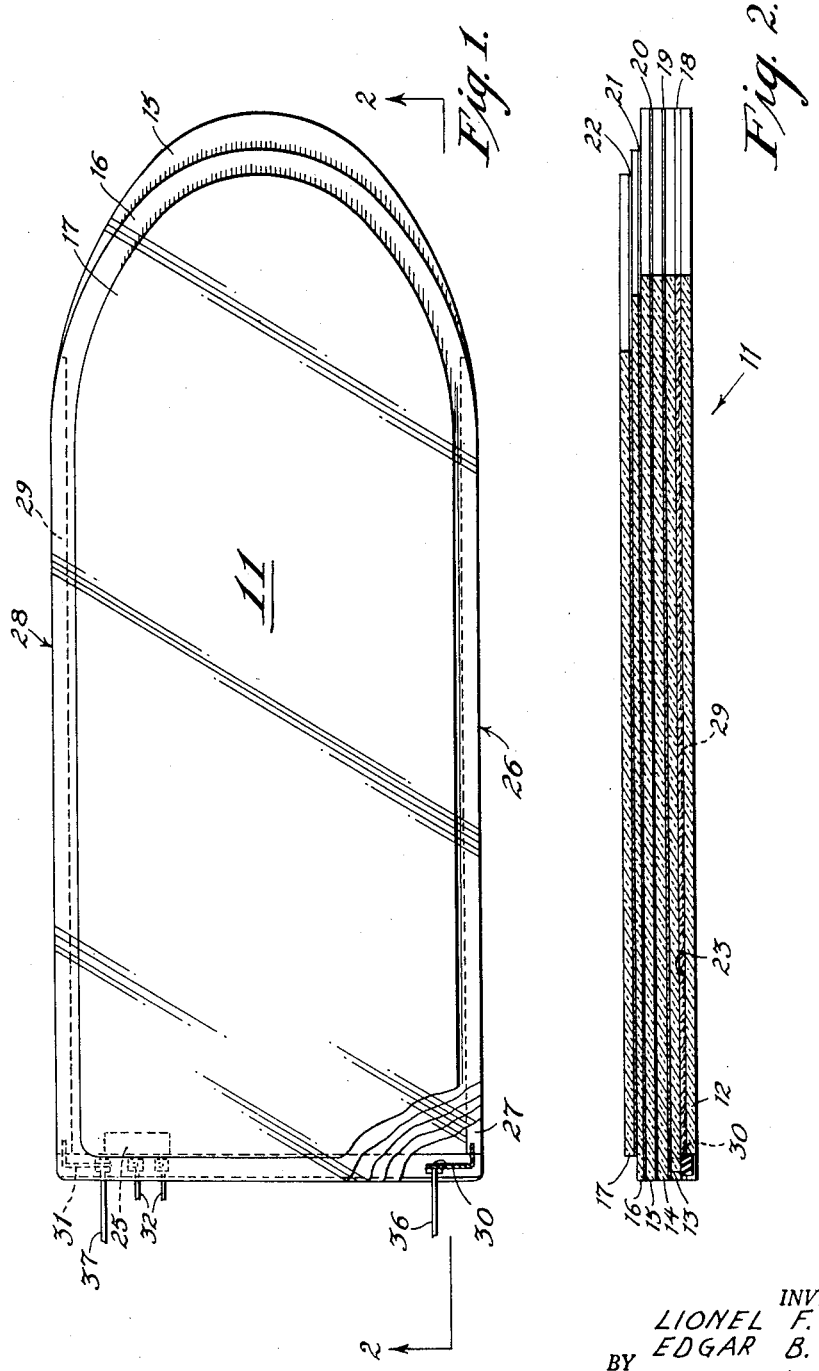
INVENTORS.
LIONEL F. LEVY
EDGAR B. COALE
BY
Leonard L. Kalish
ATTORNEY.

April 12, 1960 E. B. COALE ET AL 2,932,710
CONSTRUCTION IN ELECTRICALLY CONDUCTING TRANSPARENT PANEL
Filed March 7, 1955 4 Sheets-Sheet 2

INVENTORS.
LIONEL F. LEVY
EDGAR B. COALE
BY
ATTORNEY

April 12, 1960   E. B. COALE ET AL   2,932,710
CONSTRUCTION IN ELECTRICALLY CONDUCTING TRANSPARENT PANEL
Filed March 7, 1955   4 Sheets-Sheet 3

INVENTORS.
LIONEL F. LEVY
BY EDGAR B. COALE

ATTORNEY.

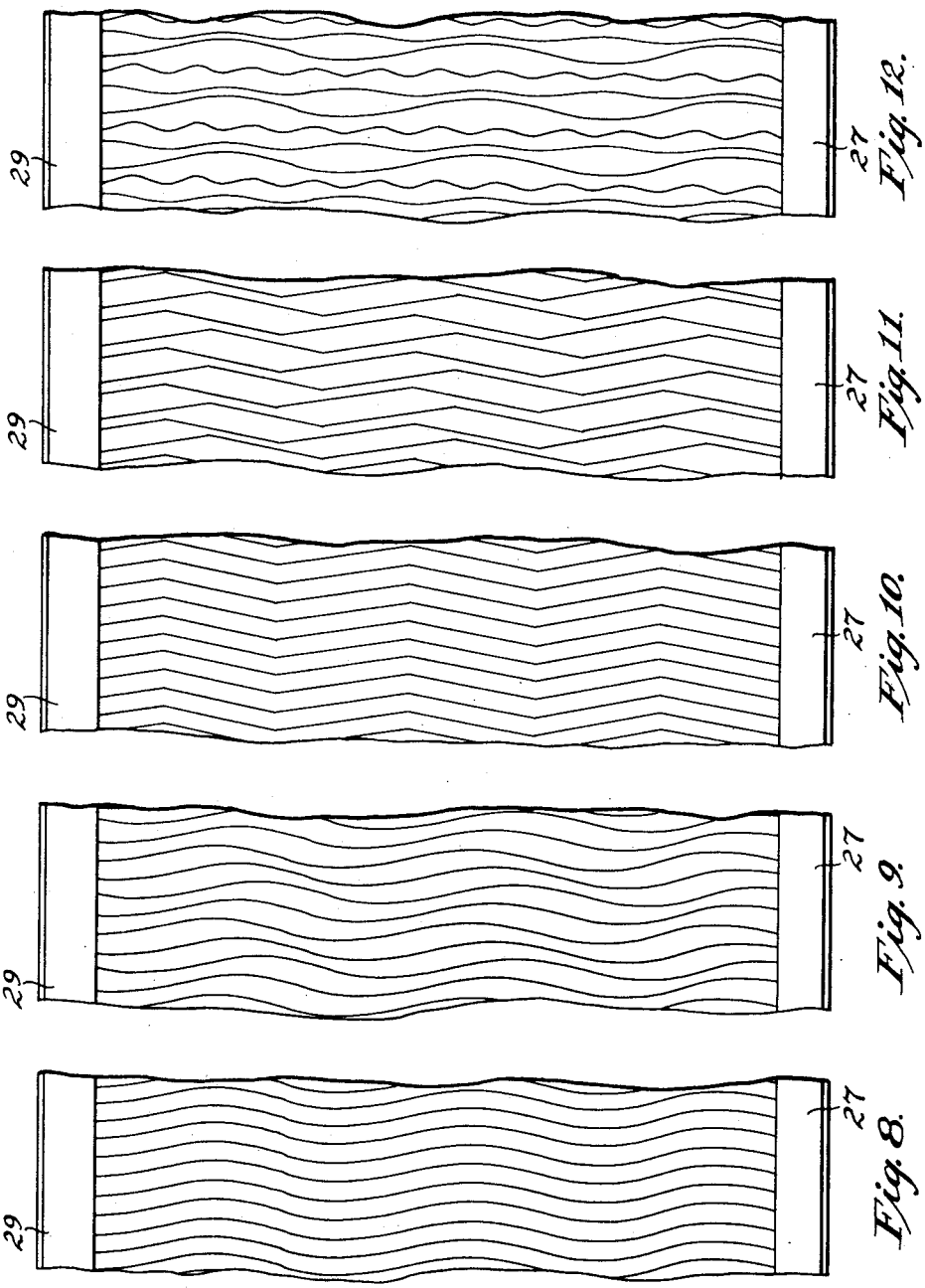

2,932,710

CONSTRUCTION IN ELECTRICALLY CONDUCTING TRANSPARENT PANEL

Edgar B. Coale and Lionel F. Levy, Philadelphia, Pa.

Application March 7, 1955, Serial No. 492,430

4 Claims. (Cl. 219—19)

The present invention relates to a glass panel having very narrow and closely spaced lines of electrical conductors thereon, all of which conductors may be connected in parallel in an electrical circuit, or some of which conductors may be connected in parallel with each other and several parallel-connected groups of conductors connected in series with each other (or individual conductors separately energized). In one aspect or embodiment, the present invention relates to electrically heatable transparent panels, as, for instance, electrically heatable windows for aircraft and vehicles generally, whereby the window can be kept clear of ice, frost and condensation, so as to maintain visibility under unfavorable climatic or atmospheric conditions.

The prevention of icing or frost upon the windows of aircraft, land vehicles, and in some cases water-borne vessels, constitutes an important problem under extreme cold-weather and rapid icing conditions; particularly, where the window is, of necessity, comparatively thick so as to withstand differences in air pressure. Under such conditions, it is not feasible or practical to supply sufficient heat to the outside surface of the window by heated air blown against the inside surface. Moreover, de-icing by the application of alcohol or glycerine or the like to the outside of the window is not altogether desirable, both because it is neither fully effective nor dependable and because it smears the glass or interferes with its optical properties and thus reduces visibility.

It has heretofore been proposed, as for instance in U.S. Patent 2,429,420, to apply a conductive coating of tin chloride as a thin film, to the glass surface of the window, to act as an electrical-conducting heating film covering the entire surface of the window.

However, this, it is believed, is not altogether satisfactory construction both because it unfavorably affects the visibility through the window and also because such film does not produce uniform heating; producing irregularities of heating in various areas. Moreover, the temperature required for the application of the tin chloride affects the optical properties of the glass, and the tin chloride coating itself reduces visibility. Furthermore, such coatings tend to deteriorate under the influence of heat and air. Such coatings are incapable of being formed into separate electrical circuits as would permit less than the whole to be energized at any time.

A laminated window is formed of one or more glass plates and one or more transparent plastic plates or sheets, alternating with each other. The window is preferably provided with a glass plate on each of its two outer surfaces, and for the best optical properties, a glass plate should constitute each of the outermost laminations of the window.

The plastic plates or sheets may be either of the kind which will firmly bond themselves to a glass surface when pressed thereagainst with the application of suitable heat, or may be of the kind which do not (in and of themselves) form an adequate bond with glass under heat and pressure. When one or more of the plastic laminations are of such non-bonding type of plastic, then such plastic lamination is faced with a thin layer of a bonding type of plastic such as polyvinyl plastics or "Synthane," which then serves to effect a firm bond between glass surface and the non-bonding plastic lamination. However, in many instances, the bonding type of plastic alone may be used between the glass plates; the thickness of such bonding type plastic being varied according to the general strength requirements and the ballistic characteristics required of the window.

To one of the surfaces of one of the inner glass plates, or, preferably, to the inner surface of the outermost glass plate of such composite or laminated window, or to one of the surfaces of a plastic panel therein, preferably to the outer surface of the outermost plastic panel (to which the outermost glass plate is bonded), a large number of very narrow and very thin closely-spaced metallic electrical conductors are applied; the width of these conductors being so small as to be substantially invisible to the eye having normal (20–20) vision at a distance greater than approximately eighteen inches, and with the electrical conductors occupying a comparatively small percentage or portion of the total area of the surface of the glass or plastic, namely, not more than about 25% of the total area of the surface, and preferably about 3% to 10% of the area, so that the light-transmission is not objectionably reduced (when compared with what the transmission would be without these electrical conductors).

These electrical conductors are preferably formed of silver, though other metallic electrical conductors may be used. These conductors are preferably connected in parallel with each other by an electrically conducting bus-bar or "header" extending across, along or near the opposite edges of the conductor-bearing plate; contacting the terminals of these conductors at the respective edges of the plate, so that an electrical current may be passed through these conducting lines "in parallel." In this manner, a sufficient amount of current, of comparatively low voltage, may be passed through these conductors.

The conductor-bearing surface of the glass or plastic plate or panel is then juxtaposed to and bonded to a plate, panel or bonding-sheet, to form the laminated window, so that the electrical conductors will be on the inside of the composite or laminated window.

By way of example, the width of the electrical conductors (in a plane parallel to the surface of the panel which bears them) may be as fine as one ten-thousandth of an inch (0.0001") to nine ten-thousandths of an inch (0.0009"), and their thickness (transversely of the window) may be as thin as from one to three ten-thousandths of an inch (0.0001" to 0.0003"). These dimensions may be varied according to the voltage to be used, the transverse dimension of the window on which the conductors are laid, the light-transmission requirements, and/or the heat-generating requirements. These dimensions may also be varied according to extent to which the conductors are connected in parallel with each other or in series with each other. The number of such conductors (per inch of panel-surface) may vary, as, for instance, from fifty (50) to two hundred and fifty (250) conductors per inch.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

In the accompanying drawings, in which like reference characters indicate like parts:

Figure 1 is an elevational view of a window embodying the present invention.

Figure 2 is a section on line 2—2 of Figure 1.

Figure 3:
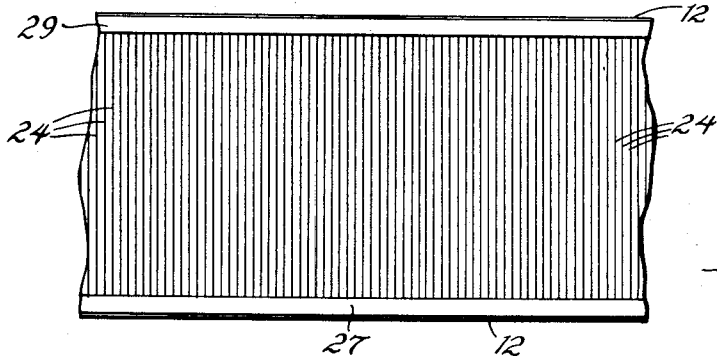
Figure 3 represents an elevational view of a fragmentary portion of the window shown in Figure 1 (on a much enlarged scale), with the electrical conductors exaggerated, so as to permit their graphic illustration.
Figure 4:
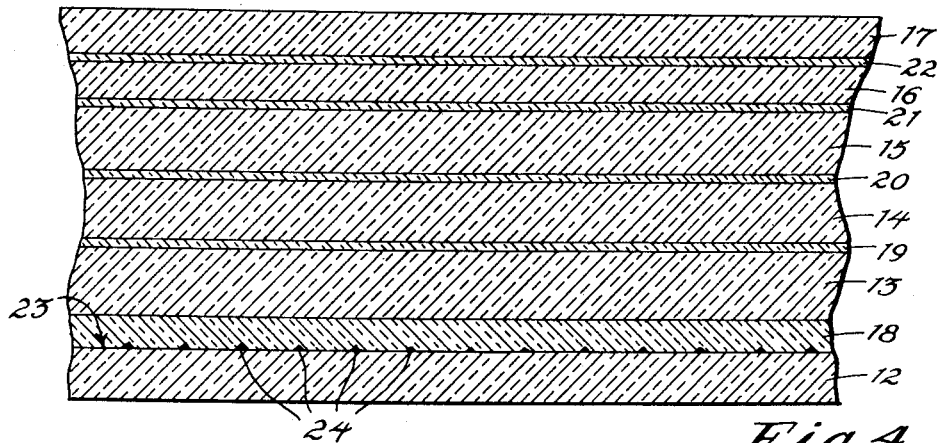
Figure 5:
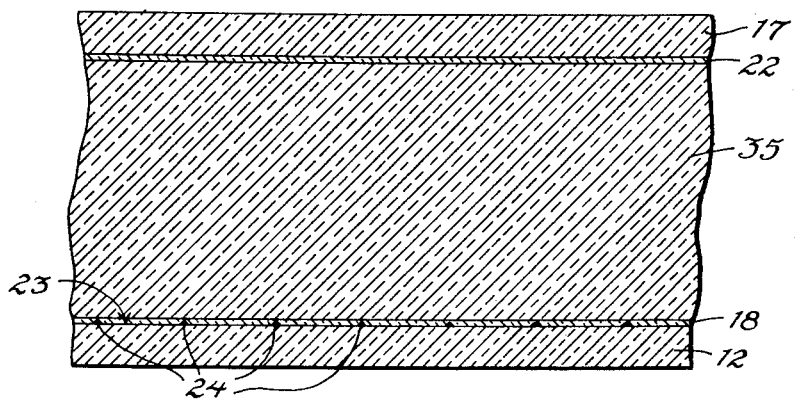
Figure 5 represents a section similar to that shown in Figure 4, but showing another embodiment of the present invention.
Figure 6:
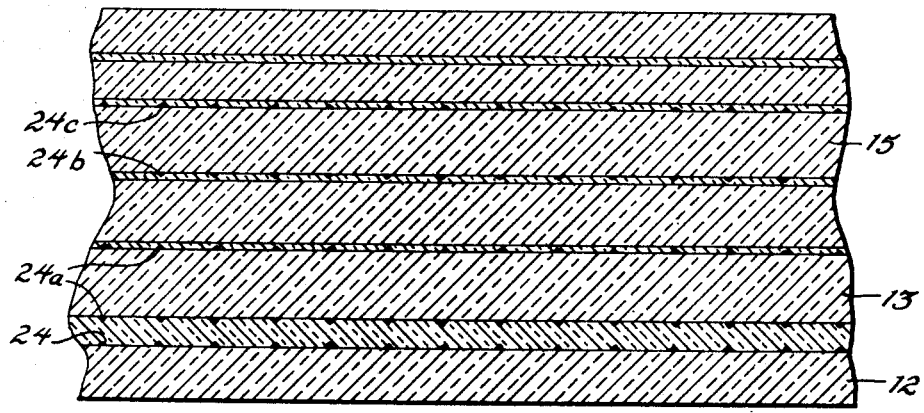
Figure 6 represents a section similar to that shown in Figures 4 and 5 showing another form of construction embodying the present invention, in which several of the interior surfaces of one or more of the panels or laminations of the composite window have electrical conductors applied to them, so that heat may be applied in more than one plane, namely, in several parallel planes.
Figure 7:
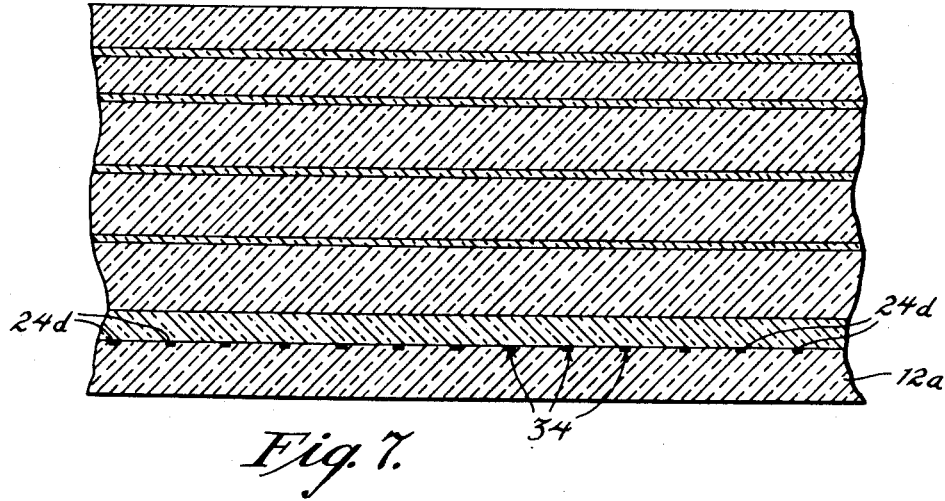

Figure 7 represents a section similar to the section shown in Figures 4, 5 and 6, showing another modified embodiment of the present invention, in which the electrical conductors, instead of being laid on the surface of a panel, are laid into shallow grooves or channels formed in the panel's surface; these channels or grooves being again relatively narrow, namely, of the fineness indicated above for the conductors, and being of a frequency, per inch, of the order indicated for the conductors. The in-laid conductors may be of a depth less than 0.0001".

Figure 8 represents an elevational view of a fragmentary portion of a panel or window (similar to that shown in any of the foregoing figures) in which the conductors 24, instead of being straight, are curved back and forth, in phase with each other, as, for instance, sinuously curved lines in phase with each other.

Figure 9 represents a view, similar to that shown in Figure 8, in which the conductors 24 are curved (as, for instance, sinuously) but in which the adjacent conductor-lines are out of phase with each other.

Figure 10 represents a view, similar to that shown in Figures 8 and 9, in which the parallel conductors 24 are zig-zagged lines whose components are straight lines, and in which such parallel zig-zag lines of conductors are in phase with each other.

Figure 11 represents a view similar to that shown in Figure 10, in which the adjacent zig-zag conductor lines are out of phase with each other.

Figure 12 represents a view, similar to that shown in Figures 8 and 9, in which adjacent curved conductor lines have different frequencies of undulations and in which adjacent lines are also out of phase with each other.

In the embodiment shown in Figures 1, 2, 3 and 4 the window, designated generally by the numeral 11, is composed of six glass-plates, numbered 12 to 17, inclusive; with the outside of the window being formed by the plate 12. The glass-plates are bonded to each other by intervening plates or sheets, of variable thickness, of transparent synthetic plastic material such as the plastic designated "Synthane" or other glass-bonding plastic layers, such as polyvinyl plastics. Thus, the bonding lamination 18 may be somewhat thicker than the bonding laminations 19, 20, 21 and 22.

To the inner surface 23 of the outermost glass plate or panel 12, the electrical conductors 24 are applied (see Figure 4). The conductors 24 may be applied directly to the surface 23, with the surface 23 left intact, namely, optically plane, as indicated in Figure 4, or in grooves, as indicated in Figure 7.

In Figures 8 to 12, inclusive, a number of alternative arrangements or embodiments are shown in respect to the form of the conductors 24. Thus, to overcome certain optical effects as, for instance, diffraction, which may be caused by straight parallel lines (or to achieve other effects), the conductors 24 may be other than straight lines, and may also be non-parallel. Thus, for instance, the conductors may be in the form of waved lines, waving back and forth in sinuous curves or in other suitable curves, as indicated in Figures 8, 9 and 12. These back-and-forth waving lines, may either be in phase as in Figure 8 or out of phase as in Figure 9, or they may be of uniform wave-frequency as in Figures 8 and 9 or of different wave-frequencies as respects adjacent conductors as indicated in Figure 12. Likewise, zig-zag lines having straight-line components may be used, as indicated in Figures 10 and 11; either in phase as in Figure 10 or out of phase as in Figure 11. Such zig-zag lines may also have different frequencies, as respects adjacent conductors.

In the in-phase arrangements, indicated in Figures 8 and 10, the conductors 24 are generally parallel, and so the distance between adjacent conductors remains the same from one set of ends of the conductors to the other set of ends thereof. While in the non-parallel arrangements, indicated in Figures 9, 11 and 12, the distance between adjacent conductors varies (namely, alternately increases and decreases) from one set of ends of such conductors to the other set of ends thereof, yet the average spacing between the conductors from one set of ends thereof to the other set of ends thereof, may still remain uniform, as between successive conductors.

Figures 8 to 12, inclusive (as some of the other figures) are necessarily more or less schematic, and much over-size, because it would be impossible to illustrate these ideas in anything even approaching actual size, as in actual size the conductors are virtually invisible to the naked eye and are so fine that they could not be drawn. Therefore, it is to be understood that neither the actual spacings nor shapes nor frequencies indicated in Figures 8 to 12, inclusive, are intended to be restrictive; but are intended merely as illustrative.

One set of ends of all the conductors 24, along or near the edge 26 of the window may be connected by means of the bus-bar 27, while the other ends of the conductors 24, at the other edge 28 of the window, may be connected by means of the bus-bar 29 (the conductors extending across the window 11, between the edges 26 and 28 thereof). These bus-bars or header-strips 27 and 29 are preferably formed of thin layers of silver. Preferably, the bus-bars 27 and 29 are plated simultaneously with the application or formation of the conductors 24, so as to be integral therewith, or, alternatively, a bus-bar may be applied across the ends of the conductor by placing a thin ribbon or band of a suitable soft metal, such as lead or the like, over the ends of the conductors at each edge of the window.

Flexible or pliable lead-cables 30, such as braided wires, are connected to the bus-bars 27 and 29. The ends of cables 30 and 31 are imbedded between the glass plate 12 and the plastic layer 18, so as to be kept in firm contact with the bus-bars 27 and 29.

Temperature-sensing elements 25 may also be imbedded between two or more of the laminations, preferably between the glass-plate 13 and the bonding plastic layer 19, with suitable electrical leads 32 extending therefrom, so that the temperature of the window may be sensed and the signal transmitted to suitable electrical control means (and/or visible or audible signaling or indicating means) whereby the current across conductors 24 may be turned on and off or the voltage regulated from time to time, according to the temperature of the window or the heat-application-demand.

In the embodiment shown in Figure 5, only the two outer glass plates 12 and 17 are used, with a relatively thick intervening plate 35 or a transparent plastic, such as "Plexiglas" or "Lucite" or other of the methyl methacrylate plastic (or other transparent plastic) or requisite physical and optical characteristics. If the plastic selected for the plate 35 does not in and of itself have bonding properties to form a firm bond with the glass plates 12 and 17 (upon the application of heat and pressure), then intervening thin bonding layers 18 and 22 are interposed between the opposite sides of the plastic plate 35 and the facing surfaces of the glass plates 12 and 17.

In the embodiment shown in Figure 6, the window is provided with a plurality of parallel planes of conductors 24, 24a, 24b and 24c. These conductors are disposed on the interior surface of glass-plate panel 12, on both surfaces of glass-plate panel 13 and on both surfaces of glass-plate panel 15. In this manner, heat may be applied in more than one plane, namely, in several parallel planes. By so applying the heat in more than one plane, extremely cold conditions or extreme icing conditions may be better overcome, or the required heat may be applied at lower temperatures; yet retaining the same total current-input required for the de-icing or defogging under any given weather condition or outside temperature. Moreover, by applying the heat in more than one plane, the temperature of the window may be maintained more nearly uniformly throughout its thickness, or the temperature of the window (from one side thereof to the other side thereof) may be graded according to any predetermined or desired gradation. The two or more layers of electrical conductors may be connected in parallel or in series with each other. The several layers of conductors may be placed in separate circuits, each with its own thermostatic control, and each set to a different temperature and/or a different current-input.

In the embodiment shown in Figure 7 the conductors 24d on the interior surface of glass-plate panel 12 are positioned within shallow grooves or channels 34 formed on the interior surface of glass-plate panel 12. Grooves 34 are of such fineness that the conductors 24d are substantially flush with the interior surface of glass-plate panel 12.

In the making of the window of the present invention, such as for example the embodiment shown in Figures 1, 2, 3 and 4, the electrical conductors 24 are applied to the surface 23 of the glass panel 12 before the window as a whole is assembled or the glass-plate panels or laminations joined to each other through the intervening plastic sheets or layers.

The electrical conductors 24 are applied to the surface 23 of the panel 12 by plating the conductor-metal onto the panel, as follows:

The surface 23 of glass panel 12 is coated with a thin coating of a material which will "set" and form a relatively hard form-retaining film over the glass surface, and which can be scribed mechanically, so as to cut away thin lines thereof and expose the glass beneath such lines. Alternatively, surface 23 of glass panel 12 may be coated with a photosensitive coating which may then be exposed to light through a suitable master screen, so as to print (photographically) onto such photosensitive coating the lines desired. The photosensitive coating may then be developed, so as to dissolve away or wash away the coating along the lines exposed to the light and leave behind the coating where the light did not strike it (or vice versa, according to the type of photosensitive coating used). If the conductors are to be laid into grooves formed in the surface 23 of glass panel 12 (as in the embodiment of Figure 7), then the coating (in either event, namely, whether the lines are to be scribed thereon mechanically or whether the lines are to be formed thereon photographically) should be of a material which is also resistant to hydrofluoric acid, so that after the lines are formed through the coating, the glass panel may be exposed to hydrofluoric acid or the fumes thereof, for a suitable length of time, chemically to etch grooves along the lines of any desired depth.

In addition to the lines formed, to correspond with the electrical conductors desired, a broad metallic band, possibly a quarter of an inch to one-half inch wide, is provided along the two marginal zones of the surface 23 at which the conductor-lines end. Preferably the width of these two marginal zones equals or exceeds the aggregate widths of all the conductors connected thereby. This should be so where the metal of which the bus-bars 27 and 29 are to be formed is of the same conductivity or the same metal as that of which the individual conductors 24 are formed. If their conductivity is greater, then their cross-section can be reduced. Moreover, instead of making the width of the bus-bars 27 and 29 equal to the aggregate width of the individual conductors 24, the width of the bus-bars may be reduced and their thickness correspondingly increased.

The metal to form the conductor-lines 24 may be applied by any of the now conventional mirror-producing methods, using any of the metals which can be used in such processes, such as silver or copper or gold. The entire surface 23, including the coating and the scribed lines, is so silvered or mirrored, and thereafter the balance of the coating is removed by being dissolved away by a selective solvent or by chemical means, so as to wash away the coating and with it to remove the mirror-applied metal in the areas between the scribed lines provided for the conductors 24.

If the glass surface 23 is grooved, as mentioned above, then an alternative procedure may be used, whereby the coating is first removed and then the metal to form the conductors is applied in the form of a paste, such as an amalgam which is mechanically wiped into the small grooves in the glass where it "sets" in situ; although the mirror method may also be used where the glass is grooved.

After the conductors 24 have been so applied to the surface 23 or in the grooves 34, the several sheets or panels of glass are then laminated to each other by means of the aforementioned intervening plastic sheets, with flat braided conductor leads 30 and 31 or thin flat flexible conductor leads (30 and 31) formed of bronze or the like, applied directly against the cheeks of the bus-bars 27 and 29 and extending out from the edge of the window as indicated at 36 and 37.

Instead of the mirror-method of applying the conductors to the panel, we may apply metal of the conductor by evaporating or vaporizing the metal in close proximity and in operative juxtaposition to panel (whose surface has been covered with the coating material which has then been scored with the appropriate lines so as to expose the plate in such lines), and the metal condensed and adhered to the plate, in this manner. No claim is made to such evaporative or sputtering method of applying the metal to the plate. In this respect, prior-art methods may be used to so apply the metal.

Each of the glass plates or panels 12 to 17, inclusive, is preferably a piece of polished plate-glass, but may be other glass, according to the optical requirements.

When the several layers or pieces of such plate-glass and the intervening layers of bonding plastic have been united, the two outermost glass surfaces are ground and polished in relation to each other, to bring them to substantially optical parallelism.

When the window is intended for uses in which the optically-parallel requirement is less critical, this parallelism is brought to within three minutes of arc on a 500 foot radius, while for most optically critical uses, this parallelism is brought to within one minute of arc on a 500 foot radius.

In the embodiment shown in Figure 5, the core-panel 35 is first ground or polished on both surfaces thereof (before it has any of the laminations applied thereto) so that its surfaces will be optically parallel within the above-indicated ranges for the generally different degrees of criticality, and it is then united with the pair of facing glass panels 12 and 17 in the manner above indicated.

Where the outer glass panels 12 and 17 are relatively thin, as contrasted with the core-panel 35, and where the degree of optical criticality permits the greater tolerance (of three minutes of arc on a 500 foot radius) in the deviation from true parallel, it is not necessary to grind the outer surfaces of the two glass plates 12 and 17 after they have been bonded to the core-panel 35 whose surfaces have previously been brought to the degree of parallelism above-indicated; provided that the core-panel 35 is first brought to a degree of parallelism substantially greater than the degree of parallelism desired in the finished window, if the final grinding of the outer glass surfaces is to be obviated. Thus, if a parallelism of the outer surfaces of the finished window is desired within three minutes or arc on a 500 foot radius, then the faces of the core-panel 35 should be ground or polished to a parallelism within one to one and a half minutes of arc on a 500 foot radius. Otherwise, or if the highest degree of parallelism is desired in the finished window, the outer surfaces of the composite window are also ground, in the manner aforesaid, after the plates 12 and 17 have been adhered to the core-panel 35.

While the conductors 24 are shown in the drawings as being arranged in such manner that they are all connected in parallel, these conductors 24 may be connected part in parallel and part in series. Thus, certain groups of the conductors 24, either all in one area or alternating in various sequences, may be connected in parallel, and such parallel-connected groups of conductors separately energized or connected in series to be energized together.

We may also form the conductor-lines in concentric circles, with each circle interrupted at one or more points, or in arcs of circles, with the ends of the arcuate portions brought out to the periphery of the panel, by conductor-lines insulatingly bridging the intervening arcuate lines or connected therewith so as to form parallel circuits through several arcuate lines, or both.

We may also form the conductor-lines in the form of one or more spirals whose convolutions are either parallel or non-parallel, with one or more interruptions in the spiral, to form separate circles, and with the ends of sections similarly brought out to the periphery of the panel.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having described the invention, the following is claimed:

1. An electrically heatable window including a uniformly grooved transparent panel, said grooves being separate and distinct elongated and generally continuous and uninterrupted and closely spaced linear grooves, and extending across a substantial area of the window from one marginal-zone of said area to an opposed marginal-zone thereof, and generally continuous and uninterrupted linear metallic electrical conductors of uniform width and uniform spacing formed in situ in said grooves, said conductors being so narrow (measured in the plane of said panel) and being so spaced in relation to their width as to be substantially unresolvable at a distance substantially greater than approximately 18 inches by the normal human eye with 20–20 vision and being substantially close to each other to attain generally uniform heat distribution over the surface of the window when an electrical current is passed therethrough, said conductors occupying not more than 10% of said area, and busbars affixed to said marginal-zones connecting the ends of said conductors.

2. An electrically heatable window according to claim 1, having a layer of transparent non-conducting material overlaying the grooved side of the conductor-bearing panel and adhered thereto.

3. An electrically heatable window according to claim 1, in which the width of the electrical conductors is between one-ten-thousandths of an inch (0.0001") and 20 ten-thousandths of an inch (0.0020") and in which the spacing of said conductors is between two hundred (200) and fifty (50) conductors per inch.

4. An electrically heatable window according to claim 1 which includes at least two glass panels and at least one transparent plastic layer therebetween.

References Cited in the file of this patent

UNITED STATES PATENTS

| | | |
|---|---|---|
| 2,222,742 | Ducret et al. | Nov. 26, 1940 |
| 2,526,327 | Carlson | Oct. 17, 1950 |
| 2,641,675 | Hannahs | June 9, 1953 |
| 2,676,117 | Colbert et al. | Apr. 20, 1954 |
| 2,773,162 | Christensen | Dec. 4, 1956 |
| 2,780,708 | Glynn et al. | Feb. 5, 1957 |
| 2,813,960 | Egle et al. | Nov. 19, 1957 |